Figure 1:
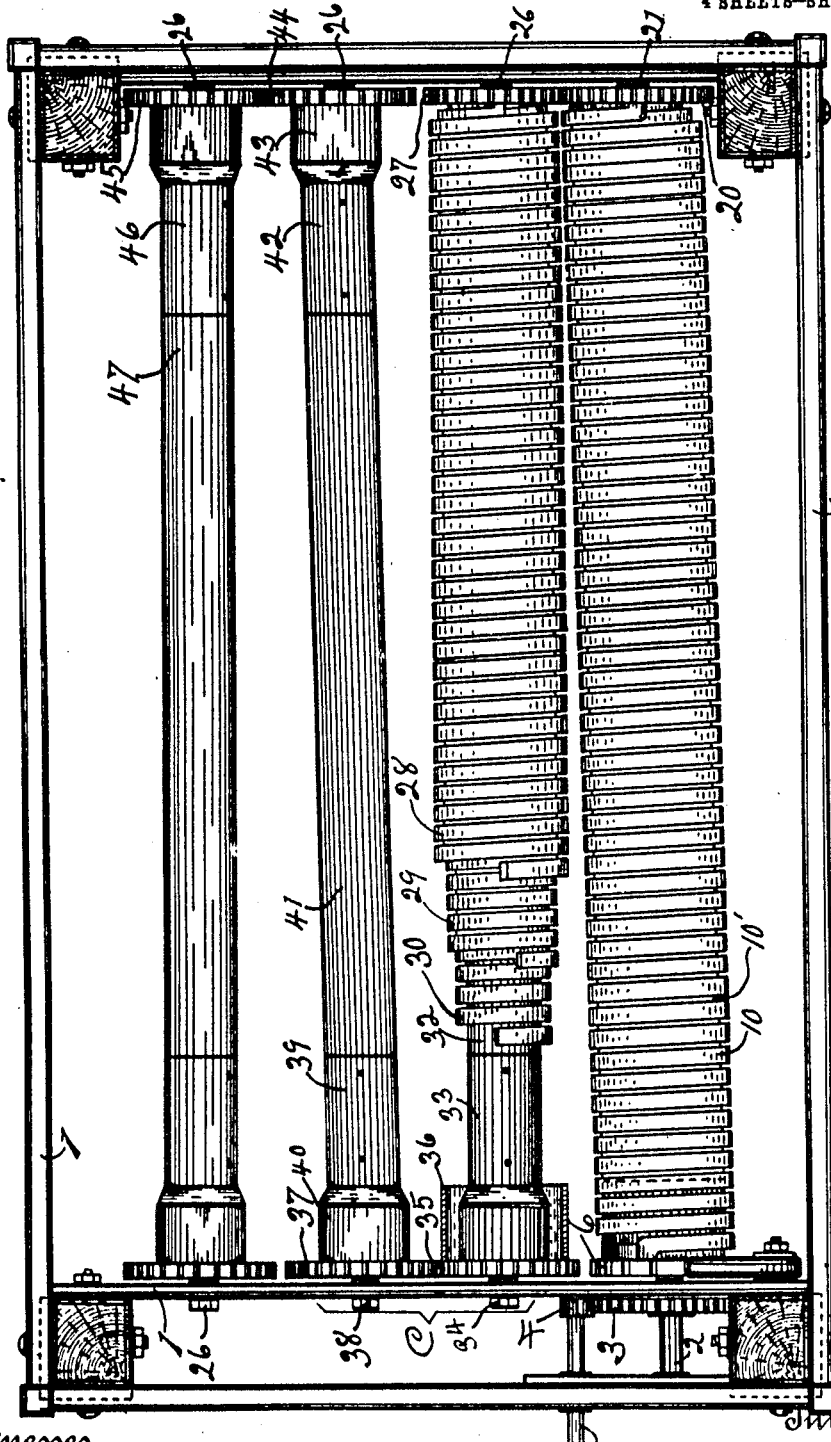

H. L. PITMAN.
SPRING MOTOR.
APPLICATION FILED SEPT. 6, 1912.

1,060,704.

Patented May 6, 1913.

4 SHEETS—SHEET 1.

Witnesses
Inventor
H. L. Pitman,
Attorney

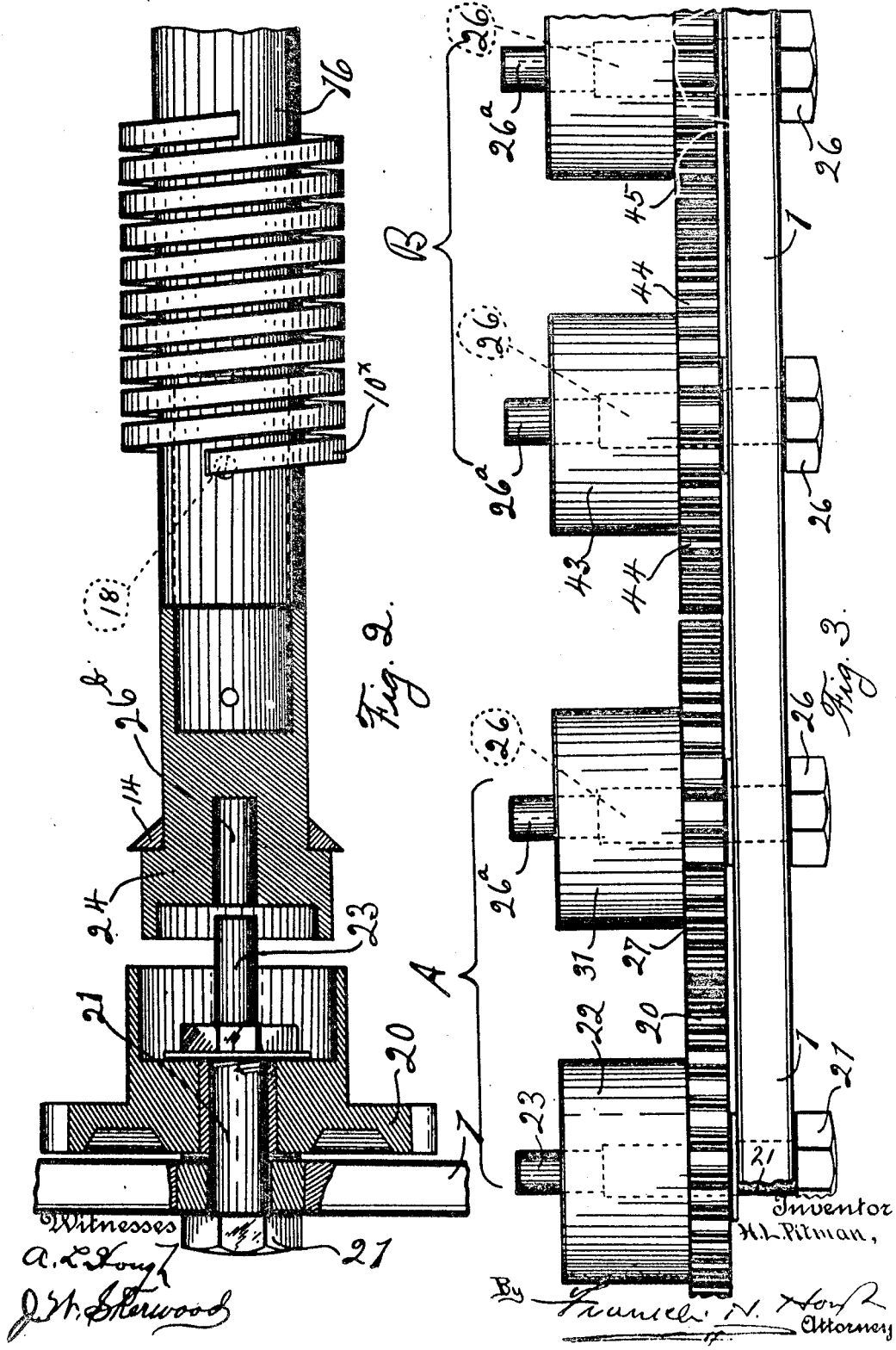

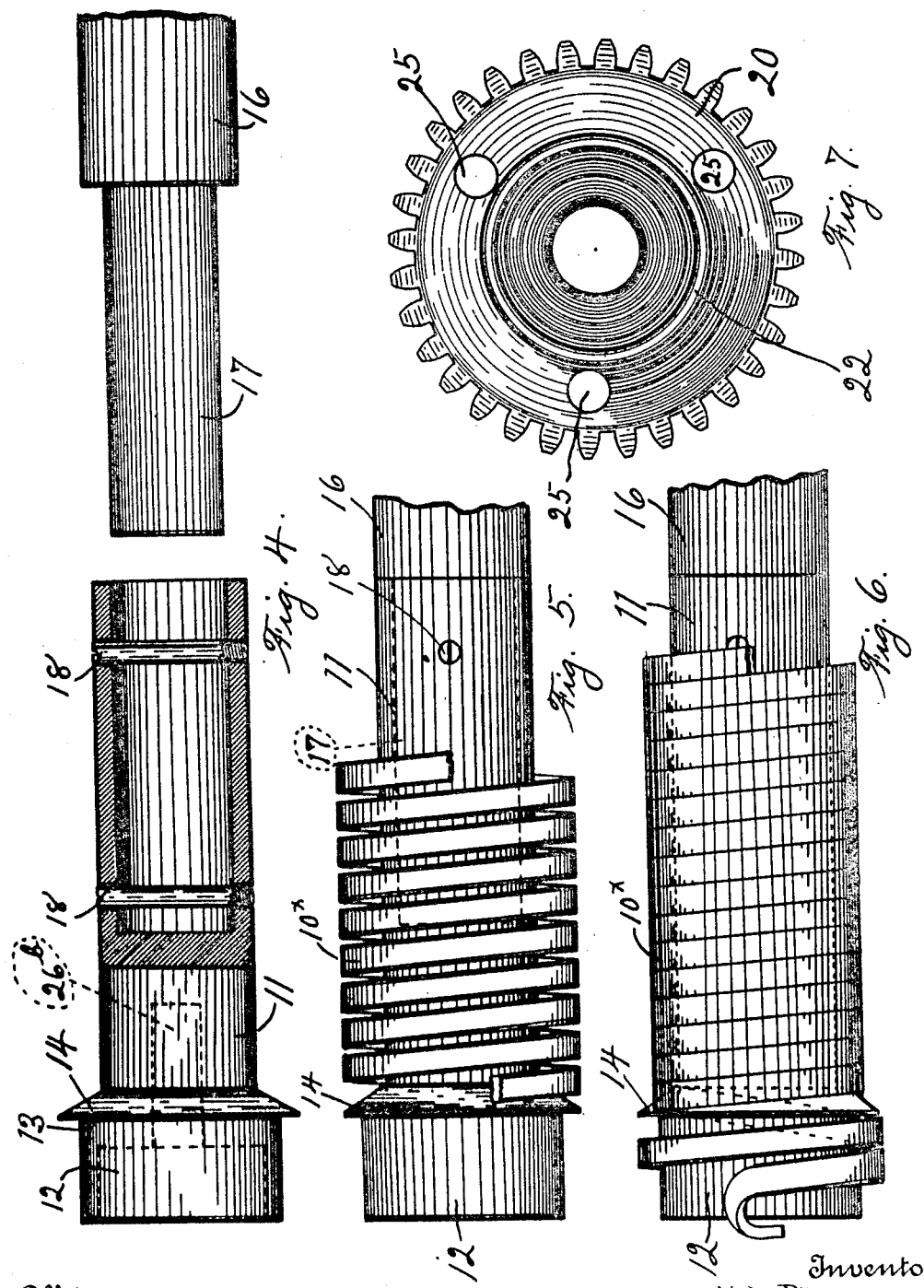

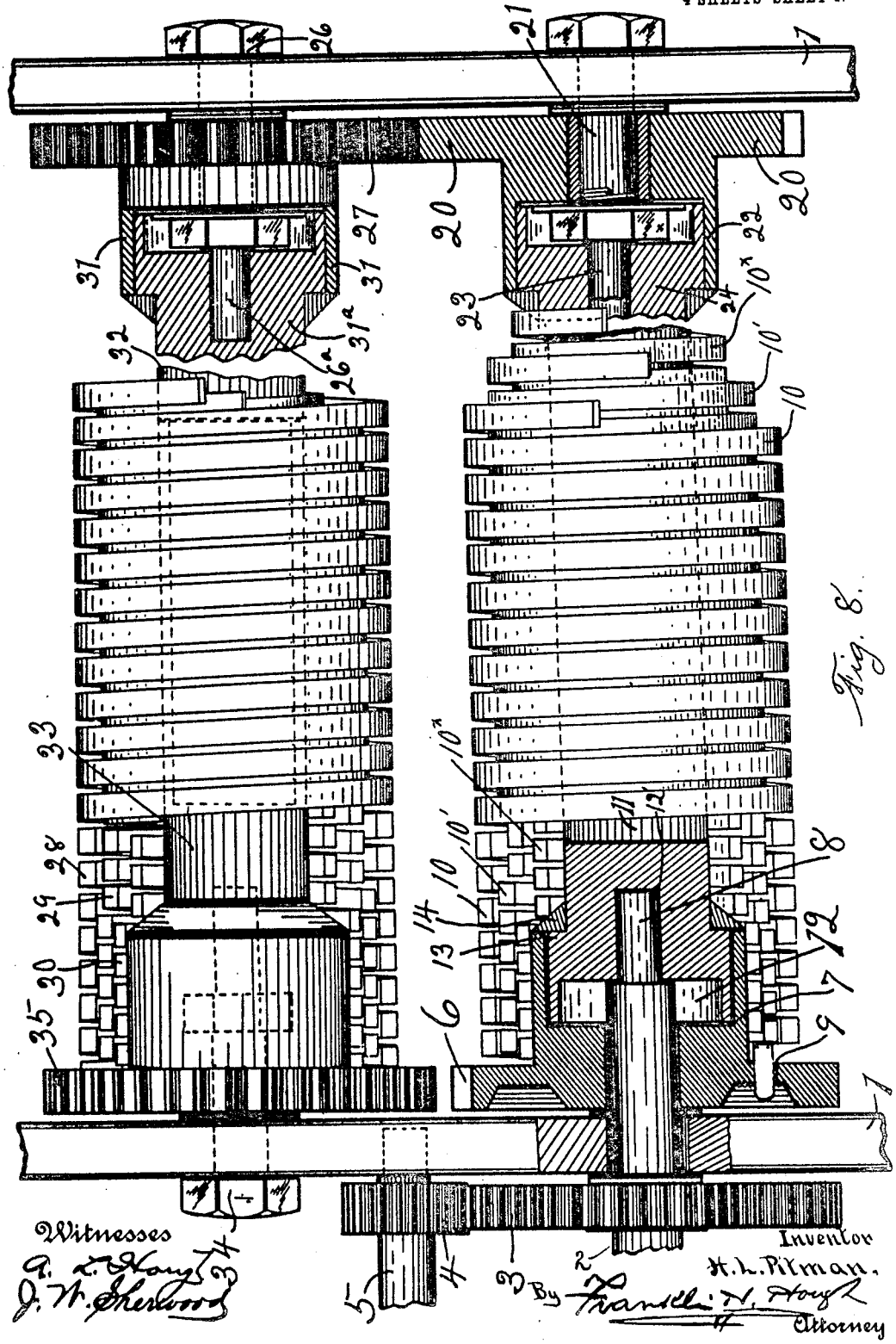

UNITED STATES PATENT OFFICE.

HENRY L. PITMAN, OF PINEVILLE, KENTUCKY.

SPRING-MOTOR.

1,060,704.	Specification of Letters Patent.	Patented May 6, 1913.

Application filed September 6, 1912. Serial No. 718,942.

*To all whom it may concern:*

Be it known that I, HENRY L. PITMAN, a citizen of the United States, residing at Pineville, in the county of Bell and State of Kentucky, have invented certain new and useful Improvements in Spring-Motors; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in spring motors of the general type covered by my pending application Serial Number 681,351.

The present invention comprises essentially means for relieving the intermeshing gear wheels of friction incident to the end thrust of the springs as they are put under tension and also to relieve the wheels entirely from the weight of the springs.

It has been found by experience that, when a very powerful battery of springs, weighing say from four hundred to five hundred pounds, is employed, it is absolutely impossible to secure the highest efficiency of a motor of this type without provision of means for relieving the transmission gears of friction incident to the end thrust and also the weight of the springs. So far as I am aware, no means have heretofore been provided in the art for this purpose.

My invention comprises various other details of construction and combinations and arrangements of parts which will be hereinafter fully described, shown in the accompanying drawings and then specifically defined in the appended claims.

I illustrate my invention in the accompanying drawings, in which:—

Figure 1 is a top plan view of a portion of my spring motor. Fig. 2 is an enlarged detail in elevation, partially in section. Fig. 3 is a detail of a portion of one side of the frame and showing the intermeshing gear wheels. Fig. 4 is a detail partially in section showing a core and shell for the reception thereof. Fig. 5 is a detail elevation of the shell and core connected thereto and illustrating a portion of a coiled spring relaxed about the shell. Fig. 6 is a similar view as Fig. 4 showing the spring under tension. Fig. 7 is an end view of a transmission gear, and Fig. 8 is a central longitudinal sectional view through the driving shaft, ratchet wheel and springs directly connected thereto, a portion of the recessed end being shown in section.

Reference now being had to the details of the drawings by numeral, 1 designates the frame in which the operative parts of the apparatus are mounted and 2 is a driving shaft which is journaled in suitable bearings in the frame and has keyed thereto a gear wheel 3 which, in the present instance, is shown as intermeshing with a pinion 4 upon a counter shaft 5 to which power may be applied in any suitable manner. Said driving shaft has keyed thereto a ratchet wheel 6 having a socket 7 therein through which the contracted end 8 of the driving shaft 2 extends, (Fig. 8). Said ratchet wheel is provided with apertures 9 formed therein to which the ends of concentrically mounted springs 10, 10' and $10^x$ are fastened.

It will be understood that the various concentrically mounted springs which are of different diameters are of different gages of wire in order that each will require the same number of turns before reaching its limit. For instance, assuming three springs concentrically mounted being employed, the outer one of which is formed of coils three inches in diameter and the spring forty inches ling, the wire being of one-fourth inch diameter, it would take about twenty-five turns to put the same under tension to its elastic limit and, if the gage of the wire of the next inner spring were the same, the coils being necessarily of a smaller diameter, it would take only about twenty turns to bring it to its elastic limit, while the innermost of the three springs being formed of the same gage wire as the others would take a still less number of turns in order to bring it to its elastic limit. It will be noted, therefore, that the number of turns that may be imparted to all of the superimposed springs working together would be determined by the limit of the innermost spring which would be much less than the number of turns that the other two springs would take. It is desirable that the springs take as many turns as possible and, to avoid the contingency cited, it is absolutely necessary to graduate the gages of the wire out of which the springs are coiled, the outermost being of the greatest gage and the innermost having wire of the smallest gage.

One end of the shell 11 (Fig. 8) is adapted to telescope within said socket portion of the ratchet wheel and is recessed as at 12, forming, in coöperation with the socket portion, a receptacle for containing a lubricant. The circumference of said shell has a shoulder 13, and 14 is a beveled ring surrounding the shell and abutting said shoulder and the circumference of said ring extends beyond the outer end of the shoulder and forms an abutment against which the marginal end of the wall of the socket portion of the wheel bears when the parts are adjusted together, as shown in Fig. 1 of the drawings. While I have shown a beveled ring forming said abutment, it will be understood, if preferred, the shell may be so constructed that a projecting portion thereof may serve the same purpose as the ring. The bottom of said recess 12 is provided with a central recess 12' adapted to receive the contracted end 8 of the driving shaft and form a support for said shell. A core, designated by numeral 16, has a contracted end 17 which telescopes within the shell and may be held therein in any suitable manner as by means of a screw 18.

Journaled on a stub shaft 21 mounted in the frame of the apparatus is a gear wheel 20 which wheel is provided with a socket 22, similar to that disclosed in Fig. 2 of the drawings, and the inner end of said stub shaft 21 is provided with a contracted portion 23 which engages a recess formed in one end of a shell 24, and which shell 24 receives the other end of the core 16. The wheel 20 has apertures 25 therein, as shown in Fig. 7, and in which the corresponding ends of the springs 10, 10' and 10ˣ may be fastened in any suitable manner.

Mounted upon the stub shaft 26, carried by the end of the frame in which the stub shaft 21 is mounted, is a gear wheel 27 of identical construction as the one before described and as illustrated in Fig. 7 and which is in mesh with the wheel 20. A coiled spring 28 is fixed at one end in an aperture in the gear wheel 27 as are also the corresponding ends the coiled springs 29 and 30, shown clearly in Fig. 1. The gear wheel 27 has its socket 31 mounted upon the stub shaft 26 and receives one end of a shell 31ª journaled upon the contracted end 26ª of the stub shaft 26, as shown in Fig. 3. One end of the core 32 telescopes within said shell 31ª in a manner as shown in Fig. 4 and its other end telescopes within a shell 33 similarly mounted upon a stub shaft 34 upon the frame, and upon which stub shaft 34 a gear wheel 35 is journaled. A collar 36 projects from the wheel 35 and is provided for the purpose of preventing the coils of the superimposed springs from squeezing in between the coils of the underlying spring. The gear wheel 35 meshes with a gear wheel 37 journaled upon the stub shaft 38, and 39 is a shell telescoping within the socket 40 upon the wheel 37, and 41 designates a core telescoping within the shell 39 and its other end within a similar shell 42 which engages the socket 43 upon the gear wheel 44 which in turn meshes with a similarly mounted gear wheel 45, receiving the shell 46 engaged by a similar core 47.

By reference to Figs. 1 and 3 of the drawings, it will be noted that the gear wheels are arranged in intermeshing pairs, A, B and C mounted alternately at opposite ends of the frame and, while I have shown three pairs of intermeshing wheels to which motion is imparted through the medium of obliquely disposed springs connected as shown, it will be understood that I do not limit myself to any particular number of springs employed, as obviously the battery of springs may be increased or decreased as may be desired accordingly as a greater or less power may be desired to be developed by the motor.

The parts being assembled as shown and described, the apparatus is put under tension by rotating the driving shaft 2 through the medium of the gear connection with the counter shaft 5 to which power may be applied by crank or otherwise. As the driving shaft is wound, the coils of all the springs in the battery are gradually contracted until they have approached the limit set by the size of the cores. As the tension increases as more force is applied, the springs which have direct connection with the ratchet wheel keyed to the driving shaft have a tendency to reach the limits of their tension before the other springs of the battery reach theirs because of their closer connection to the source of power, the inertia and friction of the other springs and parts to be moved by these springs tending to hold them back from rotating and thereby imparting to the other springs a portion of the energy being stored up in them. Therefore, in order that every spring in the battery shall receive its full proportion of the power being stored in the apparatus, an essential function in the successful operation of my improved motor resides in the action of the innermost of the springs which is adjacent to the core and the shouldered portion of the shells at each end of this spring against which the end thrust is exerted. When said innermost spring approaches its limit of elasticity, it frictionally engages the core about which it is mounted and immediately before the superimposed springs approach their elastic limit. The coils are frictionally in contact with one another, having a tendency to extend the spring with the ends thereof abutting against said beveled rings which abut against shoulders formed upon the shell or in direct contact with a beveled shoulder in the event of the latter being formed integral with the shell. Now, when this condition of the spring is reached, further rotation of the driving shaft by the source of power will result in what I have termed the "end thrust" of the spring. This "end thrust" has two causes; first, the natural tendency of the spring to extend or elongate itself as coil after coil is added to it in putting it under tension; second, the far more serious squeeze that occurs as follows: In order that a motor of a given size may have as great a capacity as possible, it is important that each spring have as many coils as possible. To illustrate, suppose we have a space forty inches long in which we are going to place a spring coiled of one-fourth inch wire. If we divide this space of forty inches by the diameter of the wire, it will give the number of coils the spring will require when put to its limit under tension. Performing the operation, 40 divided by ¼ equals 160, that is the spring will require 160 coils when fully under tension. Now, if the spring is capable of taking, say for instance 25 turns to wind it up, deduct 25 from the 160 and it will give us the number of coils the spring should have when in a relaxed condition, that is 160 less 25 equals 135 coils, the required number. The greatest amount of "end thrust" is caused by the squeezing of one coil against another as the wire is being pulled around the core time after time as rotation of the driving shaft is continued by the source of power. The coils act as wedges against one another and, in the absence of the means I have shown, combine to exert an enormous "end thrust" against the transmission gears at the ends of the springs and tend to convert the power into friction instead of rotating the wheels to transmit the energy to the next adjacent spring of the series. It is to relieve the transmission gears and to take up this "end thrust" that I have provided the shoulder and beveled rings on the shells at the ends of the core about which the springs are mounted. These shoulders confine the springs to the limit and hold them from pressing outward on the transmission gears.

Referring to Fig. 6 of the drawings will be seen the position that the inner spring assumes when at the limit of its tension with one end bearing against a beveled abutment ring. By this operation of the innermost of the springs, it will be observed that the gear wheels are entirely relieved of the end thrust or pressure of the spring, thus avoiding unnecessary friction upon the gear wheel which would greatly impair the efficiency of the operation of the motor. When the innermost spring of the set having direct connection with the driving shaft reaches its limit of tension, it forms a solid cylinder with the core upon which it is mounted and further rotary movement of the operating shaft transmits energy to the next adjacent set of springs which is in geared connection, as shown in Fig. 1 of the drawings, and further rotary movement imparted to the next adjacent set will have the same effect thereon as upon the first spring and so on through the various sets of springs of the battery until the latter is put to its utmost limit. By this particular arrangement and operation of the apparatus, the largest amount of energy which the battery of springs is capable of holding may be stored up in it by means of a single driving shaft.

Another very essential feature in the successful operation of my improved motor and by means of which the highest efficiency of the apparatus is obtained, resides in the means employed to relieve the transmission gears of the excessive weight of the springs. It has been demonstrated that, when a number of heavy springs, the entire battery weighing from two hundred to three hundred pounds, are employed, if the gears at the ends of the springs were required to support their weight, the large amount of friction resulting therefrom when the machine was in operation would necessarily seriously lower the efficiency of the device. In order to relieve the transmission gears of the excessive weight, I provide the stub shaft 26 carried by the frame, and a similar stub shaft for each transmission gear. Each of these stub shafts is provided with a contracted portion 26$^a$ designed to enter the recess 26$^b$ in the end of each of the shells, forming a journal bearing therewith which is designed to be continuously supplied with a lubricant from the adjacent lubricant receptacle 12. The entire weight of the springs being borne by the shells which in turn are supported by the journals 26$^a$ on the ends of the stub shafts mounted in the frame of the apparatus, an easy flow of energy from one set of springs to another throughout the entire battery is obtained, producing the highest efficiency of the device.

What I claim to be new is:—

1. A spring motor apparatus comprising a frame, pairs of gear wheels intermeshing alternately mounted in suitable bearings upon opposite sides of the frame, a coiled spring connecting the wheel of one pair upon one side of the frame with another gear wheel of another pair upon the opposite side of the frame, means for preventing the end thrust of the spring bearing against the wheels to which the spring is connected, and means for putting the spring under tension, as set forth.

2. A spring motor apparatus comprising a frame, pairs of gear wheels intermeshing alternately mounted in suitable bearings upon opposite sides of the frame, a coiled spring connecting the wheel of one pair upon one side of the frame with another gear wheel of another pair upon the opposite side of the frame, a core about which spring is mounted, means engaged by the core and adapted to relieve the gear wheel of the end thrust of the spring, and means for putting the spring under tension, as set forth.

3. A spring motor apparatus comprising a frame, pairs of gear wheels intermeshing alternately mounted in suitable bearings upon opposite sides of the frame, a coiled spring connecting the wheel of one pair upon one side of the frame with another gear wheel of another pair upon the opposite side of the frame, a core about which spring is mounted, shells engaged by the ends of the core and adapted to relieve the gear wheels of the end thrust of the spring, and means for putting the spring under tension, as set forth.

4. A spring motor apparatus comprising a frame, pairs of gear wheels intermeshing alternately mounted in suitable bearings upon opposite sides of the frame, a coiled spring connecting the wheel of one pair upon one side of the frame with another gear wheel of another pair upon the opposite side of the frame, a core about which each spring is mounted, shells engaged by the ends of the core and provided with abutments adapted to receive the end thrust of the spring, and means for putting the spring under tension, as set forth.

5. A spring motor apparatus comprising a frame, pairs of gear wheels intermeshing alternately mounted in suitable bearings upon opposite sides of the frame, a coiled spring connecting the wheel of one pair upon one side of the frame with another gear wheel of another pair upon the opposite side of the frame, a core about which each spring is mounted, shells engaged by the ends of the core and each having a lapping joint connection with a projection of the gear wheel, each of said shells having an abutment adapted to receive the end thrust of the spring, and means for putting the spring under tension, as set forth.

6. A spring motor apparatus comprising a frame, pairs of gear wheels intermeshing alternately mounted in suitable bearings upon opposite sides of the frame, a coiled spring connecting the wheel of one pair upon one side of the frame with another gear wheel of another pair upon the opposite side of the frame, a core about which each spring is mounted, shells engaged by the ends of the core and each having a lapping joint connection with a projection of the gear wheel and supported independent thereof, each of said shells having an abutment adapted to receive the end thrust of the spring, and means for putting the spring under tension, as set forth.

7. A spring motor apparatus comprising a frame, pairs of gear wheels intermeshing alternately mounted in suitable bearings upon opposite sides of the frame, a coiled spring connecting the wheel of one pair upon one side of the frame with another gear wheel of another pair upon the opposite side of the frame, a core about which each spring is mounted, shells engaged by the ends of the core and each having a lapping joint connection with a projection of the gear wheel, a lubricant chamber between each wheel and shell, each of said shells having an abutment adapted to receive the end thrust of the spring, and means for putting the spring under tension, as set forth.

8. A spring motor apparatus comprising a frame, pairs of gear wheels intermeshing alternately mounted in suitable bearings upon opposite sides of the frame, each gear wheel having a socket portion, a coiled spring connecting the wheel of one pair upon one side of the frame with another gear wheel of another pair upon the opposite side of the frame, a core about which each spring is mounted, shells engaged by said core, each shell having a recess in the outer end thereof adapted to telescope in the socket portion of the wheel and having bearings independent thereof, an abutment upon each shell adapted to receive the end thrust of the spring, and means for putting the spring under tension, as set forth.

9. A spring motor apparatus comprising a frame, pairs of gear wheels intermeshing alternately mounted in suitable bearings upon opposite sides of the frame, each gear wheel having a socket portion, a coiled spring connecting the wheel of one pair upon one side of the frame with another gear wheel of another pair upon the opposite side of the frame, a core about which each spring is mounted, shells engaged by said core, each shell having a recess in the outer end thereof adapted to telescope in the socket portion of the wheel and having bearings independent thereof, a stationary beveled abutment ring upon each shell adapted to receive the end thrust of the spring, and means for putting the spring under tension, as set forth.

10. A spring motor apparatus comprising a frame, pairs of gear wheels intermeshing alternately mounted in suitable bearings upon opposite sides of the frame, each gear wheel having a socket portion, a coiled spring connecting the wheel of one pair upon one side of the frame with another gear wheel of another pair upon the opposite side of the frame, a core about which each spring is mounted, shells engaged by said core, each shell having a recess in the outer end thereof adapted to telescope in the socket portion of the wheel and having bearings independent thereof, each shell provided with an extension shoulder, an abutment ring mounted upon each shell and bearing against said shoulder and adapted to receive the end thrust of the spring, and means for putting the spring under tension, as set forth.

11. A spring motor apparatus comprising a frame, stub shafts journaled therein, pairs of gear wheels journaled, one upon each of said shafts, a coiled spring connecting the wheel of one pair upon one side of the frame with another gear wheel of another pair upon the opposite side of the frame, a core to which each spring is connected, shells, to the inner end of which the core is connected, the outer end of the shells engaging said socket portions forming lapping joints therewith and the inner end of each stub shaft, an abutment upon each shell adapted to receive the end thrust of the spring, and means for putting the spring under tension, as set forth.

12. A spring motor apparatus comprising a frame, stub shafts journaled therein, pairs of gear wheels journaled, one upon each of said shafts, a coiled spring connecting the wheel of one pair upon one side of the frame with another gear wheel of another pair upon the opposite side of the frame, a core about which each spring is mounted, shells, to the inner end of which the core is connected, the outer end of each shell engaging said socket portion and chambered with a recess in the bottom of the chamber for the reception of the inner end of said stub shaft, an abutment upon each shell adapted to receive the end thrust of the spring, and means for putting the spring under tension, as set forth.

13. A spring motor apparatus comprising a frame, pairs of intermeshing gear wheels mounted in suitable bearings upon opposite sides of the frame, superimposed coiled springs of different gages of wire connecting the wheel of one pair upon one side of the frame with another gear wheel of another pair upon the opposite side of the frame, means for preventing the end thrust of the springs bearing against the wheels to which the springs are connected, and means for putting the springs under tension, as set forth.

14. A spring motor apparatus comprising a frame, pairs of intermeshing gear wheels mounted in suitable bearings upon opposite sides of the frame, each gear wheel having a socket portion, a coiled spring connecting the wheel of one pair upon one side of the frame with another gear wheel of another pair upon the opposite side of the frame, a core about which each spring is mounted, shells having sockets formed in the inner ends thereof for the reception of the ends of said core, the outer ends of the shells adapted to engage socket portions of the wheels, forming lapping joints therewith, an abutment upon the circumference of each shell adapted to receive the end thrust of the springs, and means for putting the springs under tension, as set forth.

In testimony whereof I hereunto affix my signature in the presence of two witnesses.

HENRY L. PITMAN.

Witnesses:
A. L. HOUGH,
J. W. SHERWOOD.